May 28, 1963 A. GIEGERICH ET AL 3,091,060
ULTRASONIC MACHINING
Filed June 25, 1958
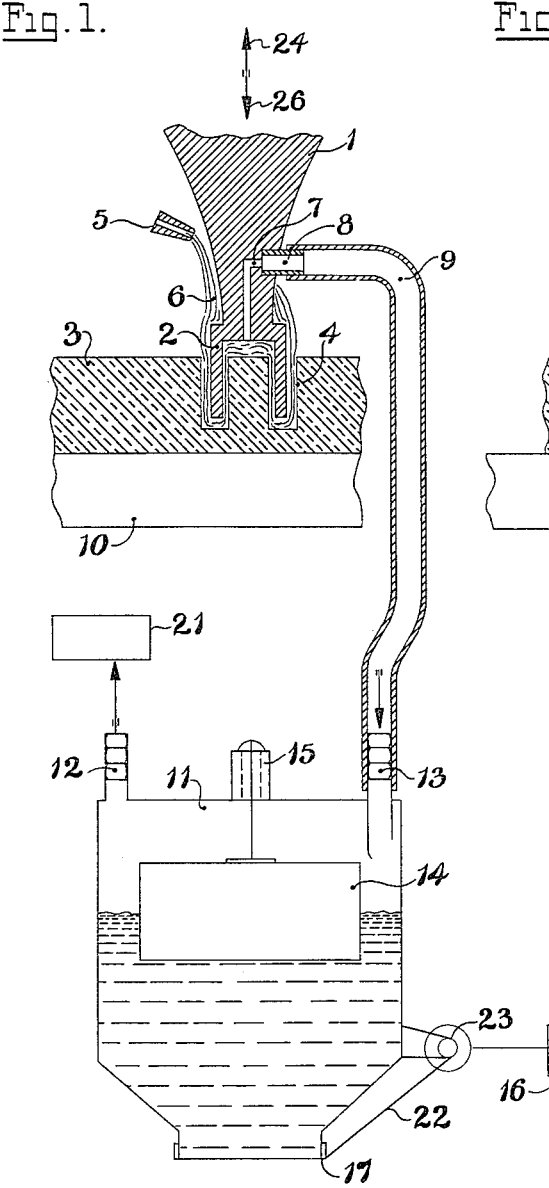
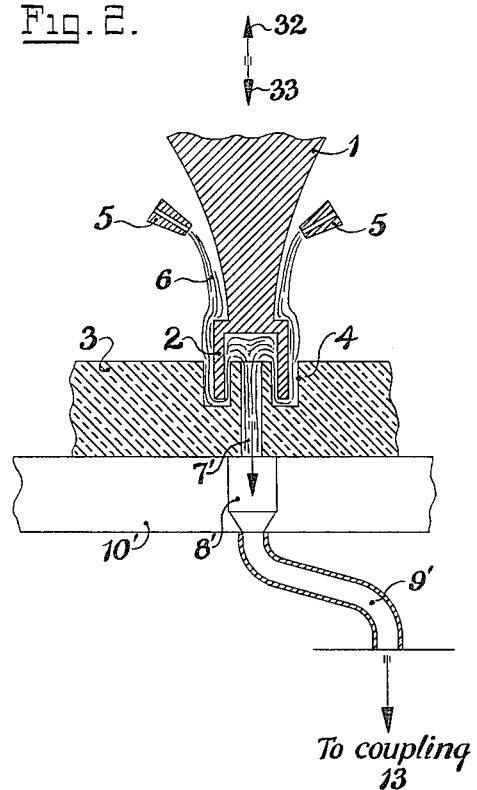
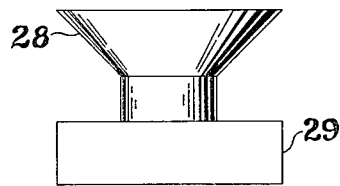
INVENTORS
AUGUST GIEGERICH
ROLAND SIEVERS
BY
Murray J. Ellman United States Patent Office 3,091,060
Patented May 28, 1963

3,091,060
ULTRASONIC MACHINING
August Giegerich and Roland Sievers, Heppenheim an der Bergstrasse, Germany, assignors to Dr. Lehfeldt & Company, G.m.b.H., Heppenheim, Germany, a corporation of Germany
Filed June 25, 1958, Ser. No. 744,474
Claims priority, application Germany July 12, 1957
18 Claims. (Cl. 51—59)

The present invention relates to an improved machining apparatus. More particularly, the present invention relates to an improvement in ultrasonic drilling machines wherein the efficiency of the apparatus is substantially increased.

In order to drill holes through very hard materials such as ceramics, ultrasonic drilling apparatus has been devised wherein the drilling member is reciprocating at an ultrasonic frequency and a drilling slurry having abrasive particles suspended therein is introduced between the drilling member and the material being drilled or machined.

The drilling member or drill is generally made of a metal or material which is softer than either the abrasive particle in the slurry or the material being drilled. Accordingly, during reciprocation of the drill towards and away from the material, the abrasive particles become partially imbedded in the softer drill member. This relationship wherein the drill is softer than the material being drilled or the abrasive particles is essential. Otherwise, if the drill were harder than the material being drilled, the abrasive particles would quickly erode the drill itself.

This essential relationship in ultrasonic drilling and machining apparatus poses several difficulties, the leading one of which is that the efficiency or speed of drilling slowly decreases with the depth of the hole being drilled. That is, the deeper is the hole, the greater is the amount of abrasive particles which are imbedded in the drill. Therefore the abrasive particles doing the actual drilling in such a situation are spent particles which have lost most of their effectiveness by having already been used for drilling or grinding purposes. Accordingly, it is not possible with the conventional apparatus to continuously provide fresh drilling slurry to the ultrasonic drilling apparatus. The previously utilized and imbedded slurry impedes the flow of new slurry and prevents the latter from reaching that area between the drill and the material being drilled. It can be seen that this difficulty is increased when the hole becomes deeper.

The same difficulty is present when large diameter holes are being drilled since in this case fresh slurry is not able to reach the central or axial portion of the drill.

These disadvantages are overcome by utilizing the present invention wherein a negative pressure is used for causing the slurry to flow substantially continuously so that fresh slurry is continuously being introduced into that area between the drill and the material being drilled.

It is accordingly an object of the present invention to provide a new and improved machining apparatus using a machining slurry wherein the slurry flows continuously thereby introducing fresh slurry between the machining tools and the material to be machined.

Another object of the present invention is to provide an improved ultrasonic drilling apparatus wherein the drilling slurry flows continuously through a channel formed in the drilling member.

A further object of the present invention is to provide an improved ultrasonic machining apparatus using a machining slurry wherein the machining slurry is caused to flow substantially continuously through an opening in the material being machined and through a communicating opening in the support member for the material.

Still another object of the present invention is to provide a new and improved machining apparatus using a machining slurry wherein the spent machining slurry is accumulated in a reservoir until a preselected amount has been collected.

Yet a further object of the present invention is to provide a new and improved machining apparatus using a machining slurry wherein a substantially continuous flow of the slurry is maintained and wherein the spent slurry is collected and recirculated into the machining operation.

With the above objects in view, the present invention mainly consists of an apparatus for machining material wherein a machining slurry is used. This apparatus includes a support member arranged to support the material being machined, and a machining member having a machining surface portion adapted to be moved into and out of contact with the material supported by the support member for machining purposes. At least one of these members is formed with at least one channel therein, which channel has an end thereof communicating with the area adjacent the machining surface portion. Means are provided for introducing a machining slurry between the machining surface portion of the machining member and the material being machined. Finally, means are arranged at the other end of the channel for moving the machining slurry under pressure into the area adjacent the machining surface portion and out through the channel, whereby a substantially continuous flow of machining slurry is provided between the machining portion of the machining member and the material being machined.

If the machining process is a drilling process, the drilling slurry is moved under pressure through a channel in the drilling member. The pressure is produced by a vacuum pump which causes the slurry to be sucked out from the area between the drilling surface portion of the drilling member and the material being drilled.

If desired, control means can be utilized for assuring a steady and substantially continuous flow of the machining slurry and to eliminate waste by recirculating spent slurry.

The improved apparatus of the present invention is to increase the efficiency of ultrasonic drilling apparatus by moving the machining slurry subsantially continuously through an opening in the machining member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic view partially in section of a first embodiment of apparatus incorporating the principles of the present invention; and FIG. 2 is a diagrammatic view partially in section of a second embodiment incorporating the principles of the present invention.

Referring to the drawings and more particularly to FIG. 1, it can be seen that the material 3 to be machined is arranged on a support member 10. Arranged above the support member 10 and spaced therefrom is a machining member 1 in the shape of an elongated drill member.

The machining member 1 is provided with a machining surface portion 2. Formed axially within the machining member 1 is an L-shaped channel 7 having one end thereof communicating at one end thereof with the area adjacent the machining surface portion 2. The other end of the channel 7 communicates with a coupling 8 that in turn is attached to an exhaust conduit 9.

The opposite end of the exhaust conduit 9 is connected through a coupling 13 to the entrance of a reservoir 11. A float valve 14 is provided in the reservoir 11 connected to a control valve 15 which in turn is connected to the atmosphere.

The reservoir 11 is provided with a second coupling 12 to which is attached a vacuum pump 21.

The reservoir 11 is open ended at the bottom portion thereof and is maintained in closed condition by means of a closure member 17.

The closure member 17 is pivotally mounted by a lever 22 about a pivot point 23. Also pivotally mounted about the pivot point 23 is an adjustable weight 16.

In FIG. 1, it can also be seen that machining slurry 6 is introduced about the periphery of the drill 1 through one or more nozzles. 5. Only one of the nozzles 5 is shown in FIG. 1, although it is clear that a plurality thereof may be arranged circumferentially about the drill 1 to introduce slurry 6 between the machining surface portion 2 of the drill 1 and the material 3 to be drilled.

In operation, the drill 1 is reciprocated in the direction of the arrows 24 and 26 respectively. This reciprocating movement is produced by conventional reciprocating means which can be of the type used with ultrasonic drill presses, for example. In such arrangement a transducer is energized to vibrate or reciprocate the drill 1 at a frequency which may be in the order of 20kc. per second.

The slurry 6 containing the abrasive particles for the drilling or grinding function flows down about the pehiphery of the machining surface portion 2 of the drill 1 and between this portion and the material 3 to be machined. The reciprocating action of the drill 1 repeatedly presses the abrasive particles in the slurry 6 against the material 3.

As has been pointed out hereinabove, the material out of which the drill 1 is fabricated is chosen to be softer than the material 3 to be machined. Accordingly, the abrasive particles in the slurry 6 wear away the material 3 by the repetitive hammer action of the drill 1.

For the shape of the machining surface portion 2 shown, an annular slot 4 will be cut in the hard material 3.

In conventional ultrasonic drilling apparatus as the machined surface portion 2 proceeds to cut deeper into the material 3, the drilling action of the drill 1 will be substantially decreased due to the accumulation of the slurry in the annular slot 4.

However, with the present invention, operation of the vacuum pump 21 produces a negative pressure in that end of the conduit means 9 attached to the reservoir 11. Accordingly, the slurry is moved under pressure upwardly into the area adjacent the lower end portion of the channel 7 in the drill 1. This slurry is then sucked up through the channel 7 and coupling 8 to the conduit 9 from where it is discharged into the reservoir 11 and accumulated therein.

In this manner fresh slurry which is being introduced by the nozzles 5 continuously replaces the spent slurry which is attracted up through the channel 7 in the drill 1.

The spent slurry is accumulated in the reservoir 11 so that the level thereof is the reservoir continuously rises. The float valve 14 floating on the spent slurry will thereby be moved upwardly by the accumulation of the discharged slurry.

The closure member 17 will remain in the illustrated position by the proper adjustment of the weight 16 and due to the fact that a negative pressure exists above the level of the slurry 6 accumulated in the reservoir.

At some point, depending on the preselected level the float valve 14 will be moved upwardly into a position wherein the control valve 15 is opened to the atmosphere. At this instant the pressure in the system is equalized at atmospheric so that the negative pressure above the level of the accumulated slurry no longer exists. Therefore, this fact plus the accumulated weight of the spent slurry is sufficient to override the influence of the counterbalance weight 16, thereby forcing the weight 16 to move upwardly in the direction of the arrow 27, opening the closure member 17. The accumulated slurry is then discharged through a funnel 28 into a centrifugal pump 29 which pumps the slurry back up to the nozzles 5 to be reinserted into the drilling operation.

The conduit by means of which the slurry is transported from the pump 29 to the nozzles 5 and the transducer for reciprocating the drill 1 are not illustrated in order not to unnecessarily complicate the drawing. However, it is evident that a person skilled in the art would be able to supply these conventional details.

The effect of the continuous flow of slurry is to increase the drilling speed several times thereby providing higher efficiency drilling apparatus.

It is clear also that after the accumulated slurry is discharged through the open end of the reservoir 11, the weight 16 moves downwardly in the direction of the arrow 31 so as to again close the reservoir with the closure member 17. Similarly, the float valve 14 will move downwardly and operate the control valve 15 for sealing from the atmosphere.

Referring now to FIG. 2, a second embodiment of the apparatus is shown. In this figure, those parts having the same identifying numerals as in FIG. 1 have the same function.

The primary difference between the embodiments of the FIGS. 1 and 2 is evident by the position of the channel 7' which is located in the material 3 to be machined. This arrangement is used when the material to be machined already has a pilot hole arranged therein for drilling purposes. This pilot hole 7' is arranged to communicate with a channel 8' in the support member 10'.

An exhaust conduit 9' is connected to the bottom end of the conduit 8' for moving the machined slurry through the channel 7'.

The lower end of the conduit 9' is adapted to be connected to the coupling 13 shown in FIG. 1. The remainder of the embodiment of FIG. 2 is similar to the arrangement shown in FIG. 1.

In operation, the drilling is carried out by the reciprocation of the drill 1 in the direction of the arrows 32 and 33. The slurry 6 introduced through the nozzles 5 is sucked through the pilot hole 7' and channel 8' to the exhaust conduit 9'. This embodiment otherwise is similar to the already described arrangement shown in FIG. 1.

Accordingly with the illustrated embodiments it is possible to increase the drilling speed of ultrasonic drilling apparatus by utilizing the arrangement of the present invention. This arrangement results in continuous flow of fresh machining slurry into that area between the machining surface portion of the machining member and the material to be treated.

It is clear that the invention need not be limited to ultrasonic drilling apparatus or to any type of ultrasonic apparatus but is adaptable to any machining arrangements and method utilizing machining slurry which is used for machining purposes.

It will be understood that each of the elements described above or two or more together, may also find a useful application in other type of machining apparatus differing from the types described above.

While the invention has been illustrated and described as embodied in ultrasonic drilling apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for machining material wherein a machining slurry is used, in combination, a support member arranged to support the material being machined; a machining member having a machining surface portion adapted to be moved into and out of contact with the material supported by said support member for machining purposes, at least one of said members being formed with at least one channel therein having one end thereof communicating with the area adjacent said machining surface portion; means for introducing a machining slurry between said machining surface portion of said machining member and the material being machined; pressure means arranged at the other end of said channel for moving said machining slurry under pressure into said area adjacent said machining surface portion and out through said channel, whereby a substantially continuous flow of machining slurry is provided between said machining surface portion of said machining member and the material being machined; reservoir means connected to said pressure means for accumulating therein machining slurry which has been moved out through said channel; and control valve means connected to the atmosphere so as to equalize the pressure in said reservoir means to stop the flow of the slurry; and means responsive to the amount of slurry in said reservoir means to open said control valve means after a preselected amount of said slurry has been accumulated in said reservoir means.

2. Apparatus as claimed in claim 1 wherein said control valve means includes a control float valve for floating on the upper level of said machining slurry as it accumulates in said reservoir means, said float valve being consected to the atmosphere so as to equalize pressure in said pressure means after a preselected level of said accumulated slurry is collected in said reservoir means.

3. Apparatus as claimed in claim 1 wherein said reservoir means is formed with an open bottom portion, a counterbalanced closure member for closing said open bottom portion, said accumulated slurry being maintained in said reservoir means by said counterbalanced closure member and the pressure in said reservoir means, whereby said closure member is opened and said accumulated slurry emitted from said reservoir means after a preselected weight of said slurry is accumulated in said reservoir means and the pressure of said pressure means is equalized.

4. In an apparatus for machining material wherein a machining slurry is used, in combination, a support member arranged to support the material being machined; a machining member having a machining surface portion adapted to be moved into and out of contact with the material supported by said support member for machining purposes, said machining member being formed with at least one channel therein having one end thereof communicating with the area adjacent said machining surface portion; means for introducing a machining slurry between said machining surface portion of said machining member and the material being machined; pressure means arranged at the other end of said channel for moving said machining slurry under pressure into said area adjacent said machining surface portion and out through said channel, whereby a substantially continuous flow of machining slurry is provided between said machining surface portion of said machining member and the material being machined; reservoir means connected to said pressure means for accumulating therein machining slurry which has been moved out through said channel; and control valve means connected to the atmosphere so as to equalize the pressure in said reservoir means to stop the flow of the slurry; and means responsive to the amount of slurry in said reservoir means to open said control valve means after a preselected amount of said slurry has been accumulated in said reservoir means.

5. In an apparatus for machining material, in combination, a support member for supporting the material to be machined; a vibratory machining member having a machining surface portion located opposite said support member and defining with the same a space for the material; means for introducing a machining slurry in liquid condition at atmospheric pressure into said space and between said machining surface portion of said machining member and the material being machined; and suction means communicating with said space for sucking the machining slurry out of said space for moving the machining slurry in a substantially continuous flow over said machining surface portion of said machining member at a less than atmospheric pressure, whereby the vibratory movement of said vibratory machining member is not substantially impeded by said machining slurry within said space.

6. In an apparatus for machining material, in combination, a support member for supporting the material to be machined; a vibratory machining member having a machining surface portion located opposite said support member and defining with the same a space for the material, at least one of said members being formed with at least one channel communicating with said spacing; feeding means for introducing spaced from said channel a machining slurry in liquid condition at atmospheric pressure into said space and between said machining surface portion of said machining member and the material being machined; suction means including conduit means communicating with said channel for sucking the machining slurry out of said space and for moving the machining slurry in a substantially continuous flow over said machining surface portion of said machining member at a less than atmospheric pressure, whereby the vibratory movement of said vibratory machining member is not substantially braked by said machining slurry within said space; and means operative to connect said conduit means to said feeding means for recirculation of said machining slurry.

7. In an apparatus for machining material, in combination, a support member for supporting the material to be machined; a vibratory machining member having a machining surface portion located opposite said support member and defining with the same a space for the material, at least said machining member being formed with at least one channel communicating with said space; means for introducing spaced from said channel a machining slurry in liquid condition at atmospheric pressure into said space and between said machining surface portion of said machining member and the material being machined; and suction means communicating with said channel for sucking the machining slurry out of said space and for moving the machining slurry in a substantially continuous flow over said machining surface portion of said machining member at a less than atmospheric pressure, whereby the vibratory movement of said vibratory machining member is not substantially impeded by said machining slurry within said space.

8. In an apparatus for machining material, in combination, a support member for supporting the material to be machined; a vibratory machining member having a machining surface portion located opposite said support member and defining with the same a space for the material, at least said support member being formed with at least one channel communicating with said space and adapted to communicate with a pilot hole in the material; means for introducing spaced from said channel a machining slurry in liquid condition at atmospheric pressure into said space and between said machining surface portion of said machining member and the material being machined; and suction means communicating with said channel for sucking the machining slurry out of said space and for moving the machining slurry in a substantially continuous flow over said machining surface portion of said machining member at a less than atmospheric pressure, whereby the vibratory movement of said vibratory machining member is not substantially impeded by said machining slurry within said space.

9. In an apparatus for machining material, in combination, a support member for supporting the material to be machined; a vibratory machining member having a machining surface portion located opposite said support member and defining with the same a space for the material, at least said machining member being formed with at least one channel having one end opening within said machining surface portion and communicating with said space; means located outwardly of said machining member for introducing spaced from said channel a machining slurry in liquid condition at atmospheric pressure into said space and between said machining surface portion of said machining member and the material being machined; and suction means communicating with the other end of said channel for sucking the machining slurry out of said space and for moving the machining slurry in a substantially continuous flow into said space and over said machining surface portion of said machining member at a less than atmospheric pressure, whereby the vibratory movement of said vibratory machining member is not substantially impeded by said machining slurry within said space.

10. In an apparatus for machining material, in combination, a support member for supporting the material to be machined; a vibratory machining member having a machining surface portion located opposite said support member and defining with the same a space for the material, at least said support member being formed with at least one channel having one end opening opposite said machining surface portion for communicating with a pilot hole in the material communicating with said space; means located outwardly of said machining member for introducing spaced from said channel a machining slurry in liquid condition at atmospheric pressure into said space and between said machining surface portion of said machining member and the material being machined; and suction means communicating with the other end of said channel for sucking the machining slurry out of said space and for moving the machining slurry in a substantially continuous flow into said space and over said machining surface portion of said machining member at a less than atmospheric pressure, whereby the vibratory movement of said vibratory machining member is not substantially impeded by said machining slurry within said space.

11. In a drilling apparatus for machining material, in combination, a support member for supporting the material to be machined; a vibratory machining member including an annular wall bounding a central recess having a bottom; said annular wall having an annular machining surface portion located opposite said support member and defining with the same a space for the material, at least said machining member being formed with at least one channel having one end opening on the bottom of said recess and being surrounded by said annular wall and by said annular machining surface portion; means located outwardly of said machining member for introducing spaced from said channel a machining slurry in liquid condition at atmospheric pressure into said space and between said machining surface portion of said machining member and the material being machined; and suction means communicating with the other end of said channel for sucking the machining slurry out of said recess and said space and for moving the machining slurry in a substantially continuous flow into said recess and over said machining surface portion of said machining member at a less than atmospheric pressure, whereby the vibratory movement of said vibratory machining member is not substantially impeded by said machining slurry within said space.

12. In a drilling apparatus for machining material, in combination, a support member for supporting the material to be machined; a vibratory machining member including an annular wall bounding a central recess and having an annular machining surface portion located opposite said support member and defining with the same a space for the material, said support member being formed with at least one channel having one end opening opposite said machining surface portion for communicating with a pilot hole in the material communicating with said space, said one end and said pilot hole being surrounded by said annular machining surface portion; means located outwardly of said machining member for introducing spaced from said channel a machining slurry in liquid condition at atmospheric pressure into said space and between said machining surface portion of said machining member and the material being machined; and suction means communicating with the other end of said channel for sucking the machining slurry out of said space and for moving the machining slurry in a substantially continuous flow into said space and over said machining surface portion of said machining member at a less than atmospheric pressure, whereby the vibratory movement of said vibratory machining member is not substantially impeded by said machining slurry within said space.

13. In an apparatus for machining material, in combination, a support member for supporting the material to be machined; a vibratory machining member having a machining surface portion located opposite said support member and defining with the same a space for the material, at least one of said members being formed with at least one channel communicating with said space; means for introducing spaced from said channel a machining slurry into said space and between said machining surface portion of said machining member and the material being machined; suction means for sucking the machining slurry out of said space and for moving the machining slurry in a substantially continuous flow over said machining surface portion of said machining member, said suction means including a conduit means communicating with said channel, and reservoir means in said conduit means so that negative pressure is produced in said reservoir means and so that machining slurry is accumulated in the same; control valve means on said reservoir means and connectable to the atmosphere so as to equalize the negative pressure in said reservoir means and to stop the flow of the slurry; and means responsive to the amount of slurry in said reservoir means to open said control valve means after a preselected amount of slurry has been accumulated in the reservoir means.

14. In an apparatus for machining material, in combination, a support member for supporting the material to be machined; a vibratory machining member having a machining surface portion located opposite said support member and defining with the same a space for the material, at least one of said members being formed with at least one channel communicating with said space; means for introducing spaced from said channel a machining slurry into said space and between said machining surface portion of said machining member and the material being machined; suction means for sucking the machining slurry in a substantially continuous flow over said machining surface portion of said machining member, said suction means including a conduit means communicating with said channel, and reservoir means in said conduit means so that negative pressure is produced in said reservoir means and so that machine slurry is accumulated in the same; and control valve means including a float valve in said reservoir means for floating on the upper surface of the accumulated slurry and adapted to connect said reservoir means to the atmosphere when a preselected level is reached by the accumulated slurry, and a discharge valve on said reservoir means and adapted to be held in a closing position by the negative pressure in said reservoir means, said discharge valve being adapted to being opened by the weight of the accumulated slurry when said float valve connects the interior of the reservoir means to the atmosphere.

15. In an apparatus for machining material, in combination, a support member for supporting the material to be machined; a vibratory machining member having a machining surface portion located opposite said support member and defining with the same a space for the material, at least said machining member being formed with at least one channel having one end opening within said machining surface portion and communicating with said space; means located outwardly of said machining member for introducing spaced from said channel a machining slurry into said space and between said machining surface portion of said machining member and the material being machined; suction means for sucking the machining slurry out of said space and for moving the machining slurrry in a substantially continuous flow into said space and over said machining surface portion of said machining member, said suction means including a conduit means communicating with said channel, and reservoir means in said conduit means so that negative pressure is produced in said reservoir means and so that machine slurry is accumulated in the same; and control valve means including a float valve in said reservoir means for floating on the upper surface of the slurry and adapted to connect said reservoir means to the atmosphere when a preselected level is reached by the accumulated slurry, and a discharge valve on said reservoir means and adapted to be held in a closing position by the negative pressure in said reservoir means, said discharge valve being adapted to being opened by the weight of the accumulated slurry when said float valve connects the interior of the reservoir means to the atmosphere.

16. In an apparatus for machining material, in combination, a support member for supporting the material to be machined; a vibratory machining member having a machining surface portion located opposite said support member and defining with the same a space for the material, at least said support member being formed with at least one channel having one end opening opposite said machining surface portion for communicating with a pilot hole in the material and communicating with said space; means located outwardly of said machining member for introducing spaced from said channel a machining slurry into said space and between said machining surface portion of said machining member and the material being machined; suction means for sucking the machining slurry out of said space and for moving the machining slurry in a substantially continuous flow into said space and over said machining surface portion of said machining member, said suction means including a conduit means communicating with said channel, and reservoir means in said conduit means so that negative pressure is produced in said reservoir means and so that machine slurry is accumulated in the same; and control valve means including a float valve in said reservoir means for floating on the upper surface of the slurry and adapted to connect said reservoir means to the atmosphere when a preselected level is reached by the accumulated slurry, and a discharge valve on said reservoir means and adapted to be held in a closing position by the negative pressure in said reservoir means, said discharge valve being adapted to being opened by the weight of the accumulated slurry when said float valve connects the interior of the reservoir means to the atmosphere.

17. In a drilling apparatus for machining material in combination, a support member for supporting the material to be machined; a vibratory machining member having an annular machining surface portion located opposite said support member and defining with the same a space for the material, at least said machining member being formed with at least one channel having one end opening within said machining surface portion and communicating with said space, said one end being surrounded by said annular machining surface portion; means located outwardly of said machining member for introducing space from said channel a machining slurry into said space and between said machining surface portion of said machining member and the material being machined; suction means for sucking the machining slurry out of said space and for moving the machining slurry in a substantially continuous flow over said machining surface portion of said machining member, said suction means including a conduit means communicating in the said channel, and reservoir means in said conduit means so that negative pressure is produced in said reservoir means and so that machining slurry is accumulated in the same; control valve means on said reservoir means and connectable to the atmosphere so as to equalize the negative pressure in said reservoir means and to stop the flow of the slurry; and means responsive to the amount of slurry in said reservoir means to open said control valve means after a preselected amount of slurry has been accumulated in the reservoir means.

18. In a drilling apparatus for machining material in combination, a support member for supporting the material to be machined; a vibratory machining member having an annular machining surface portion located opposite said support member and defining with the same a space for the material, at least one channel having one end opening opposite said machining surface portion for communicating with a pilot hole in the material and communicating with said space, said one end and said pilot hole being surrounded by said annular machining surface portion; means located outwardly of said machining member for introducing spaced from said channel a machining slurry into said space and between said machining surface portion of said machining member and the material being machined; and suction means including a conduit means communicating with said channel, and reservoir means in said conduit means so that negative pressure is produced in said reservoir means and so that machining slurry is accumulated in the same; and control valve means on said reservoir means and connectable to the atmosphere so as to equalize the negative pressure in said reservoir means and to stop the flow of the slurry; and means responsive to the amount of slurry in said reservoir means to open said control valve means after a preselected amount of slurry has been accumulated in the reservoir means so that the slurry can be recirculated to said means for introducing the slurry.

References Cited in the file of this patent

UNITED STATES PATENTS

| 2,268,076 | Lawlor | Dec. 30, 1941 |
| 2,460,819 | Bodine | Feb. 8, 1949 |
| 2,460,919 | Bodine | Feb. 8, 1949 |
| 2,804,724 | Thatcher | Sept. 3, 1957 |

FOREIGN PATENTS

| 916,861 | France | Aug. 26, 1946 |
| 1,063,883 | France | Dec. 23, 1953 |
| 712,807 | Great Britain | July 28, 1954 |